United States Patent

Siegmann

[11] 4,124,163
[45] Nov. 7, 1978

[54] RELIEF PRESSURE VALVE FOR HOT MELT ADHESIVE

[75] Inventor: Carl Siegmann, Bremen, Germany

[73] Assignee: Firma Heinrich Bühnen KG, Bremen, Germany

[21] Appl. No.: 783,828

[22] Filed: Apr. 1, 1977

[30] Foreign Application Priority Data

Apr. 3, 1976 [DE] Fed. Rep. of Germany ... 7610466[U]

[51] Int. Cl.² .............................................. B05B 1/30
[52] U.S. Cl. .............................. 239/533.15; 239/570; 239/583
[58] Field of Search ................... 239/453, 533.1, 533.7, 239/533.15, 570, 571, 583; 137/538, 541

[56] References Cited

U.S. PATENT DOCUMENTS

| 2,806,740 | 9/1957 | Fredrickson et al. ........... 239/571 X |
| 2,951,647 | 9/1960 | Dreisin .......................... 239/533.7 X |
| 3,348,520 | 10/1967 | Lockwood .................... 239/533.7 X |
| 3,537,653 | 11/1970 | Jones ............................... 239/533.15 |

Primary Examiner—Johnny D. Cherry
Attorney, Agent, or Firm—Olson, Trexler, Wolters, Bushnell & Fosse, Ltd.

[57] ABSTRACT

A valve for hot melt adhesives is provided with a spring pressed piston urged open by adhesive pressure. A nozzle on the valve has an outlet channel of predetermined volume. Upon termination of fluid pressure the piston retracts through a volume less than the predetermined nozzle outlet channel volume to suck back a limited amount of adhesive to prevent dripping of adhesives.

11 Claims, 1 Drawing Figure

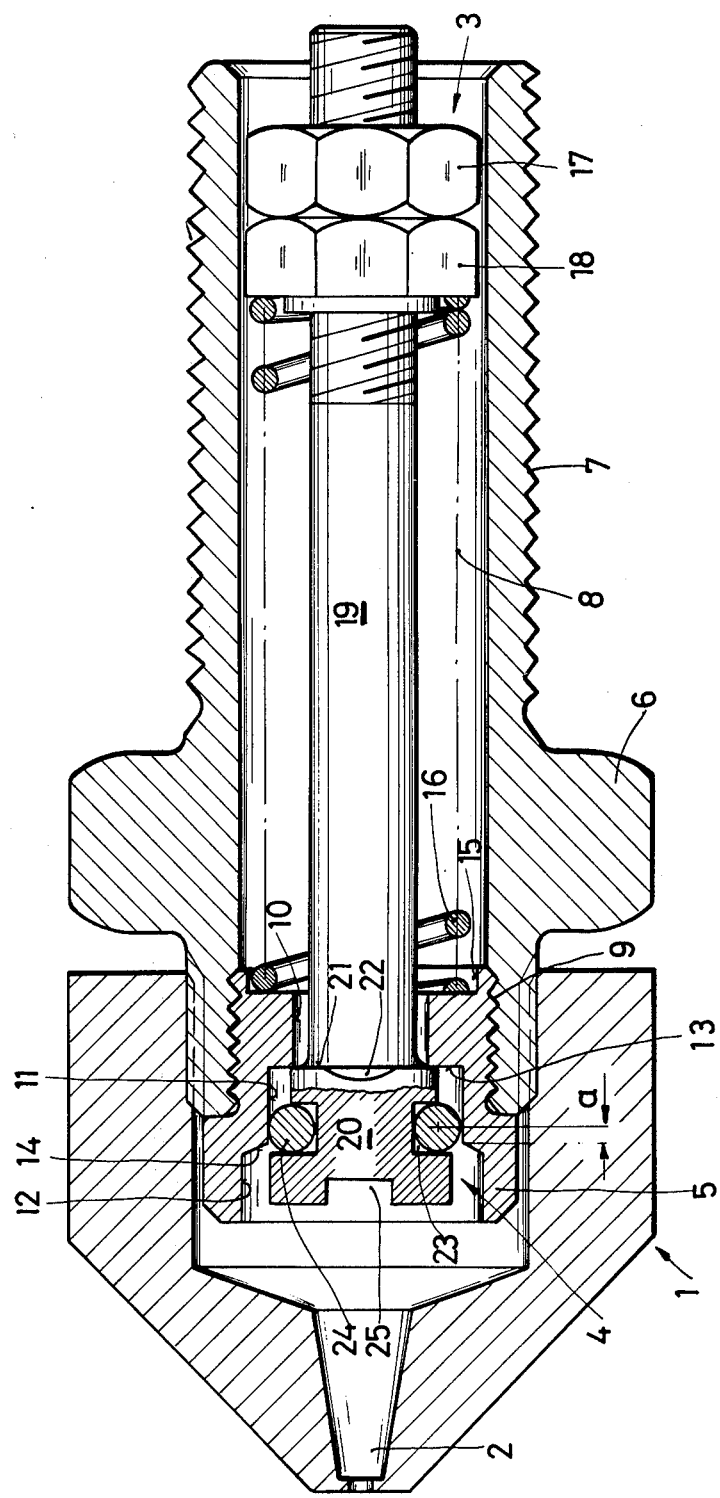

RELIEF PRESSURE VALVE FOR HOT MELT ADHESIVE

The invention relates to a relief pressure valve for application devices of hot melt adhesives or the like which is arranged before the outlet channel of said adhesives in the direction of the flow of the hot melt adhesive or the like and opens it, has a spring-loaded, axially movable sealing body as well as a sealing seat for it and controls the distribution of hot melt adhesives or the like in dependence on its pressure.

Application devices for hot melt adhesives or of materials comparable with respect to their consistency have before their outlet channel normally a valve which shall avoid after-flow of the hot melt adhesive or the like at the end of the work. On portioning application devices the valve can be part of the portioning piston. On other application devices by means of which hot melt adhesive or the like shall be distributed, a relief pressure valve in the arrangement mentioned in the beginning is frequently used as the valve. If pressure is exerted on the hot melt adhesive which is in a storage tank, by means of a trigger, the relief pressure valve opens so that the hot melt adhesive or the like gets past the valve into the outlet channel of the nozzle or the like and can be distributed. During the distribution, not only the space surrounding the relief pressure valve is filled with hot melt adhesive or the like but also the volume which is before the valve and surrounds the outlet channel. If the pressure on the hot melt adhesive is relieved, the relief pressure valve closes. The volume, which is before the valve in the direction of flow, thereby remains filled with hot melt adhesive or the like so that even after the closing of the relief pressure valve residual quantities of hot melt adhesive or the like can exit. This impairs not only the portioning but leads also to pulling threads. Both are undesirable. On portioning application devices this disadvantage has been eliminated by having the portioning piston carry out an overly great backstroke by which a certain quantity of the hot melt adhesive or the like was sucked back. On application devices working with relief pressure valves this problem is decreased by the fact that the volume between the relief pressure valve and the free end of the outlet channel was decreased as far as possible. However, it could not be eliminated.

The invention is based on the problem to develop further a relief pressure valve for application devices in such a way that dripping after the closing of the valve and pulling threads are safely avoided.

On a relief pressure valve of the type mentioned in the beginning, this problem is solved—as defined in the invention—by the fact that the sealing body is a piston, which is provided with a sealing element on its circumference and has a bearing surface or such and that the sealing seat is a cylinder provided with an axial stop, that the axial length of the cylinder from its free end to the stop is longer by a measure $a$ than the axial length of the piston from its bearing surface or such to the sealing circumference line of the sealing element, and that the measure $a$ with consideration of the diameter of the cylinder is set at a value which corresponds to at least part of the volume of the outlet channel.

The advantage obtained by the invention lies in the back-suction effect of the new relief pressure valve by means of which it is possible to work considerably more accurately than with application devices of the well-known type without the costs to be spent for the achievement of the back-suction effect being undesirably high. It is also favorable that the relief pressure valve as defined in the invention can be used for application devices and that the actual application devices need not be rebuilt so that older devices can also be changed over without any effort.

In the following the invention is explained on hand of an example of an embodiment which is illustrated in a longitudinal section in the drawing.

Commercial application devices for hot melt adhesives or the like have an outlet, which can be closed by a valve, as well as in the direction of the flow afterwards generally a nozzle 1. Within the nozzle there is an outlet channel 2 through which the material arriving in the direction of the flow 3 flows after it has passed a valve and leaves the application device whose other details are not shown. The valve here is a relief pressure valve 4 which is arranged in an inset 5 of a holder 6. The holder 6 has an outer thread 7 and is screwed into a corresponding taphole of the application device. Through this taphole the hot melt adhesive exits as soon as it is put under pressure and gets in the direction of flow into an axial bore 8 which is in the holder 6 and is closed on one side by the relief pressure valve 4. The inset 5, which is screwed into the open front side of the holder 6 by way of a thread 9, has an opening running in the axial direction in form of a step cylinder which in the direction of flow 3 consists of an inlet zone 10, a sealing cylinder 11 and an outlet zone 12. The inlet zone 10 has the smallest diameter, the sealing cylinder 11 a middle-sized one and the outlet zone 12 the largest diameter of this step cylinder. The transition between the inlet zone 10 and the sealing cylinder 11 is formed by a radially running stop surface 13 whereas the transition from the sealing cylinder 11 to the outlet zone 12 is a guide 14 which widens conically outward. In the front surface of the inset 5 facing the axial bore 8 there is a recess 15 which serves to hold and center a pressure spring 16 and forms a stop for this spring.

The other end of the pressure spring 16 is supported on a nut 18 secured by a jam nut 17. The two nuts 17, 18 are screwed onto the free end of a piston rod 19 which extends through the axial bore 8 of the holder 6 into the inset 5 and has a diameter which is not only smaller than the diameter of the axial bore 8 but also smaller than the diameter of the inlet zone 10 of the inset 5. On the end of the piston rod 19 the rear end in the direction of flow said piston rod goes over into a piston 20. At the place of transition there is a radial surface 21 whose diameter is larger than the inlet zone 10 of the inset 5 but smaller than the sealing cylinder 11. During an axial movement of the piston 20, the radial surface 21 of said piston bears therefore against the stop surface 13 which thereby limits the piston movement against the direction of flow 3. In order to make certain that the stop formed by surfaces 13, 21 does not assume any sealing function, the radial surface has at least one bevel 22; the hot melt adhesive or the like arriving in the direction of flow 3 can consequently independent of the position of the piston 20 flow into the sealing cylinder 11. A groove 23, in which an O-ring 24 is held, is cut into the circumference of the piston 20. The center surface of the groove 23 has a distance from the radial surface 21 of the piston that is smaller by an amount $a$ than the axial length of the sealing cylinder 11 of the inset 5. The free end of the piston 20 can as illustrated have a somewhat larger diameter than the radial surface 21 and has a transverse groove 25 or two grooves 25 crossing each other which interrupt the free front surface of the piston 20 and essentially run through radially. The purpose of the groove or grooves 25 is to take care that the hot melt adhesive can flow into and through the outlet channel 2 of the nozzle 1 even if the free front surface of the piston bears some time on the nozzle and covers the outlet channel 2.

In the rest position or closed position of the relief pressure valve 4, its parts are in the position shown in the drawing in which the pressure spring 16 pushes the piston rod 19 and the piston 20 so far to the right by way of nuts 17, 18 that the radial surface 21 of the piston 20 bears firmly on the stop surface 13 of the inset 5 and the O-ring 24 is within the sealing cylinder 11 of the step cylinder by the measure $a$. Consequently the connection between the axial bore 8 and the outlet channel 2 is interrupted. As soon as the pressure of the hot melt adhesive or the like acting on the active surface of the piston 20 is bigger than the opposing force of the pressure spring 16, as when hot melt adhesive shall be released from the application device, the piston 20 starts a motion in the direction of flow 3 toward the outlet channel 2. During this motion, hot melt adhesive is not yet pressed out of the outlet channel 2 but only the air volume which was sucked back before. At the moment when the piston has moved a distance corresponding to measure $a$, the passage between the sealing cylinder 11 and the outlet zone 12 of the inset 5 is free so that fresh hot melt adhesive or the like can follow and leave the nozzle 1. From this description it is evident that the blocking effect of the relief pressure valve 4 is preserved during the first part of the piston movement; a piston movement, which is less than the measure $a$, thus does not bring about that the hot melt adhesive can flow out.

As soon as the desired quantity of hot melt adhesive has left nozzle 1, the pressure of the hot melt adhesive is relieved within the application device. Under the influence of the pressure spring 16, the piston 20 is moved opposite the direction of flow 3 while the O-ring is guided, by means of guide 14, in the direction toward the sealing cylinder 11 and is centered. As soon as the circumference of the O-ring 24 places itself against the transition edge between guide 14 and sealing cylinder 11, the relief pressure valve 4 blocks further passage of hot melt adhesive or the like. If the piston 20 would remain in this position, part of the hot melt adhesive, which is before the piston, would yet leave the outlet channel 2 and lead to dripping or thread pulling. Actually, however, the piston 20 continues to move by the measure $a$ opposite the direction of flow 3 under the influence of the pressure spring 16. Since no hot melt adhesive or the like can follow during this movement, the hot melt adhesive which is before the piston is moved in a direction opposite the direction of flow 3 by the piston 20, i.e. it is sucked back from the outlet channel 2 so that accurate interruption of the application of the hot melt adhesive is assured.

With a given diameter of the sealing cylinder 11, the size of the volume sucked back depends on the measure $a$ by which the piston rod 20 can be moved into the sealing cylinder 11 from the moment of sealing. This volume and thereby measure $a$ should not exceed a certain amount because otherwise, by the back suction, so much air would get into the space before the piston 20 that the remainder of hot melt adhesive or the like, which remains there after the relief pressure valve has been closed, flows out through the outlet channel 2 and nullifies the back-suction effect. For this reason, the measure $a$ is preferably set in such a way that the volume corresponding to it is smaller than the volume of the outlet channel 2.

The invention is claimed as follows:

1. A relief pressure valve for application devices for hot melt adhesive comprising a valve body having a bore through which said adhesive flows in a predetermined direction, nozzle means on said body and having an outlet channel of predetermined volume for said adhesive, a sealing piston axially movable in said bore, spring means urging said piston opposite to said predetermined direction, a stop on said piston, a sealing element circumferentially disposed on said piston, means providing a cylinder in said bore, said cylinder having means forming a stop engageable with the stop on the piston for limiting movement of the piston opposite said predetermined direction, said sealing element being engageable with the sidewall of said cylinder to form a seal and defining an annular line on said piston, said cylinder having an axial length to its stop forming means greater by a predetermined amount than the axial length of said piston from said annular line to said piston stop such that a volume is defined by said predetermined amount and the diameter of said cylinder which is less than said predetermined volume of said outlet channel.

2. A valve as set forth in claim 1 wherein said spring means is disposed in said bore upstream of said piston.

3. A valve as set forth in claim 1 wherein an inset member on said body forms said last mentioned stop and said cylinder, there being a recess in the upstream end of said inset member, and a piston rod is connected to said piston, said spring means seating in said recess and bearing on said piston rod.

4. A valve as set forth in claim 3 wherein said inset member, immediately upstream of said cylinder, is provided with an inlet bore of smaller diameter than said cylinder.

5. A valve as set forth in claim 4 including a radial surface between said inlet bore and said cylinder, said radial surface forming said last mentioned stop.

6. A valve as set forth in claim 1 wherein said piston on the downstream end has at least one radial opening therein.

7. A valve as set forth in claim 1 wherein said cylinder providing means also provides a guide downstream of said cylinder for said sealing means and a cylindrical outlet zone downstream of said guide.

8. A valve as set forth in claim 1 and further comprising a piston rod extending upstream from said piston, there being a radial surface on the upstream end of said piston forming the stop on said piston.

9. A valve as set forth in claim 8 including a level on said radial surface.

10. A valve as set forth in claim 1 wherein said sealing element comprises an O-ring.

11. In a relief pressure valve for application devices for hot melt adhesive, said valve being arranged upstream of an outlet channel of said device of predetermined volume in order to open when adhesive is flowing through said device in a predetermined direction, and said valve comprising a sealing member and cooperating sealing means which are relatively axially movable for controlling the discharge of adhesive, dependent upon the adhesive pressure, the improvement comprising: said sealing member comprising a piston carrying on its circumference a sealing element which defines an annular sealing line and having a bearing surface, and said sealing means comprising a cylinder including an axial stop engageable with said bearing surface and axially spaced from a free, downstream cylinder end, and wherein the axial length of said cylinder between its free end and said stop exceeds the axial length of said piston between its bearing surface and said annular sealing line by a distance defining, together with the diameter of cylinder, a volume corresponding to a part of the volume of said outlet channel.

* * * * *